United States Patent [19]

Rung

[11] 3,803,959
[45] Apr. 16, 1974

[54] BELT SLITTING APPARATUS

[76] Inventor: Darrell G. Rung, 23422 97th Pl. West, Edmonds, Wash. 98020

[22] Filed: May 30, 1972

[21] Appl. No.: 257,936

[52] U.S. Cl.......................... 83/18, 83/175, 83/424, 83/425, 83/649, 242/75.53, 83/23
[51] Int. Cl............................................. B26d 7/14
[58] Field of Search............. 242/75.5, 75.53, 56 R, 242/56.2, 56.3, 56.4, 56.5, 56.6, 56.7; 83/18, 23, 175, 424, 425, 436, 649, 110, 111, 112

[56] References Cited
UNITED STATES PATENTS

| | | | |
|---|---|---|---|
| 3,685,756 | 8/1972 | Marx et al. | 83/175 X |
| 2,827,961 | 3/1958 | Pugh | 242/56.5 |
| 3,104,072 | 9/1963 | Doven et al. | 242/56.2 X |
| 2,569,589 | 10/1951 | Trissell | 242/56.2 X |
| 2,181,049 | 11/1939 | Douglas | 242/56.4 |
| 3,490,712 | 1/1970 | Mukai et al. | 252/75.53 |
| 2,200,811 | 5/1940 | Thompson | 242/75.53 |

Primary Examiner—Roy Lake
Assistant Examiner—James F. Coan
Attorney, Agent, or Firm—Christensen, O'Connor, Garrison & Havelka

[57] ABSTRACT

A belt slitting apparatus includes a frame, an adjustable and removable feed roll shaft mounted on the frame, and an adjustable and removable take-up roll shaft mounted on the frame. The feed shaft and take-up shaft are mounted on opposite longitudinal ends of the frame. Intermediate these two shafts is a cutting table. The ends of the cutting table are flanked by a pair of guide rolls and a pair of feed rolls which are adjustable toward and away from each other. The feed table has a pair of laterally adjustable edge guides for maintaining the lateral positioning of a belt as it traverses the cutting table. A plurality of knives mounted on the cutting table can be interposed in the path of the belt to slit the belt to any desired longitudinal width. The feed shaft and the take-up shaft are independently driven by hydraulic motors. Likewise, the guide rolls and feed rolls flanking the cutting table are driven by a hydraulic motor. Specific hydraulic circuitry provides for independent control of the hydraulic motors and allows the speed of each of the hydraulic motors to be varied from zero to maximum independent of the remaining motors.

10 Claims, 7 Drawing Figures

BELT SLITTING APPARATUS

BACKGROUND OF THE INVENTION

The present invention relates to sheet material slitting apparatus and more particularly to an apparatus for uniformly producing longitudinal slits in rolled elastic material.

Various types of machines are presently available on the market which perform the function of longitudinally slitting rolled sheet material. Particularly a machine disclosed in the U.S. Pat. to Pugh, No. 2,827,961, discloses a machine for longitudinally slitting rolled elastic material. This machine and other similar machines available on the market have several disadvantages.

For example, machines of the prior art have been provided with a feed roll or supply roll mechanism which does not feed material to the cutting bed or table of the machine. These machines rely solely upon the ability to draw material from the supply roll as needed, allowing the supply roll to rotate freely on its shaft. So drawing sheet material from the supply roll, especially elastomeric or natural elastic sheet material, will cause it to distend or distort. As the material distorts its lateral dimension will be reduced, commensurately reducing cutting accuracy. This phenomenon is referred to as "coning." Even though a machine has been preset for a given width of material to be slit, coning of the material will cause a width variance from that which has been preset. In addition, reliance solely upon drawing of the sheet material from a supply roll will cause variances since it is difficult evenly to control the rate at which material is withdrawn from the supply roll. Thus the lateral dimension of the material will vary to produce a nonuniform strip of material.

Furthermore, when slitting tacky, thick sheet material such as natural gum rubber, additional problems arise in relation to controlling the cut width of the material. In some applications, it is desirable to stretch the material as it is being cut and to preset the slit width so that the relaxed sheet product will be of a uniform desired width. Prior machines do not provide this capability since usually they employ only a driven take-up roll and possibly one set of driven guide or feed rolls. An example of such a machine is that disclosed in the above-mentioned patent.

Additionally, prior machines have not provided the capability of independently controlling the speed of the supply and take-up shafts and of the feed and guide rolls. This has led to significant problems in uniform material slitting as described above. Some machines in the prior art have provided variable speed capability, however, they have not provided differential speed capability between feed and take-up shafts and between these shafts and the guide and feed rolls.

It is therefore an object of the present invention to provide a sheet material slitting apparatus which can handle large rolls of sheet material of varying thickness. Further objects of the present invention are: to provide an apparatus which can be controlled from a central location on the machine; to provide the capability of varying the rotational speeds of the supply roll shaft, the take-up roll shaft and the feed and guide rolls; to provide a machine with driven guide and feed rolls at each end of the slitting table; to provide tension adjustability in the feed and guide rolls to adjust the pressure and tension the rolls exert on the sheet material; to provide a hydraulic drive system for belt-slitting apparatus; to provide a hydraulic system which can easily be manipulated to control the speeds of the various components of the machine; to provide an apparatus which can vary the longitudinal tension in the sheet material being slit across the slitting table.

SUMMARY OF THE INVENTION

The present invention therefore provides an apparatus for slitting sheet material including a frame having first and second ends, a supply roll shaft mounted for rotation at one end of the frame, a take-up roll shaft mounted for rotation at the other end of the frame, a pair of guide rolls and a pair of feed rolls, said guide and feed rolls mounted for rotation on the frame between the supply shaft and the take-up shaft, the shafts and the guide and feed rolls having substantially parallel axes of rotation, a knife means adjustably mounted on the frame between the guide and feed rolls, the improvement in the apparatus comprising means for driving the guide rolls, the feed rolls and the take-up shaft, the means capable of driving the take-up shaft at a speed variable from the speed at which at least one of the guide and feed rolls are driven.

In another aspect the present invention provides a method for slitting sheet material comprising: feeding the sheet material from a supply zone to a slitting zone at a first predetermined variable rate by controlling the input rate of the material at the entrance to the slitting zone and by controlling the output rate at the exit to the slitting zone, the input and output rates being substantially the same and being predetermined and variable, slitting the material between the entrance and exit to the slitting zone as the material passes through the slitting zone, feeding the material to a storage zone from the exit of the slitting zone at a third predetermined variable rate.

BRIEF DESCRIPTION OF THE DRAWINGS

A better understanding of the present invention can be acquired by reading the ensuing specification in conjunction with the accompanying drawings wherein.

DESCRIPTION OF PREFERRED EMBODIMENTS

Figure 1:
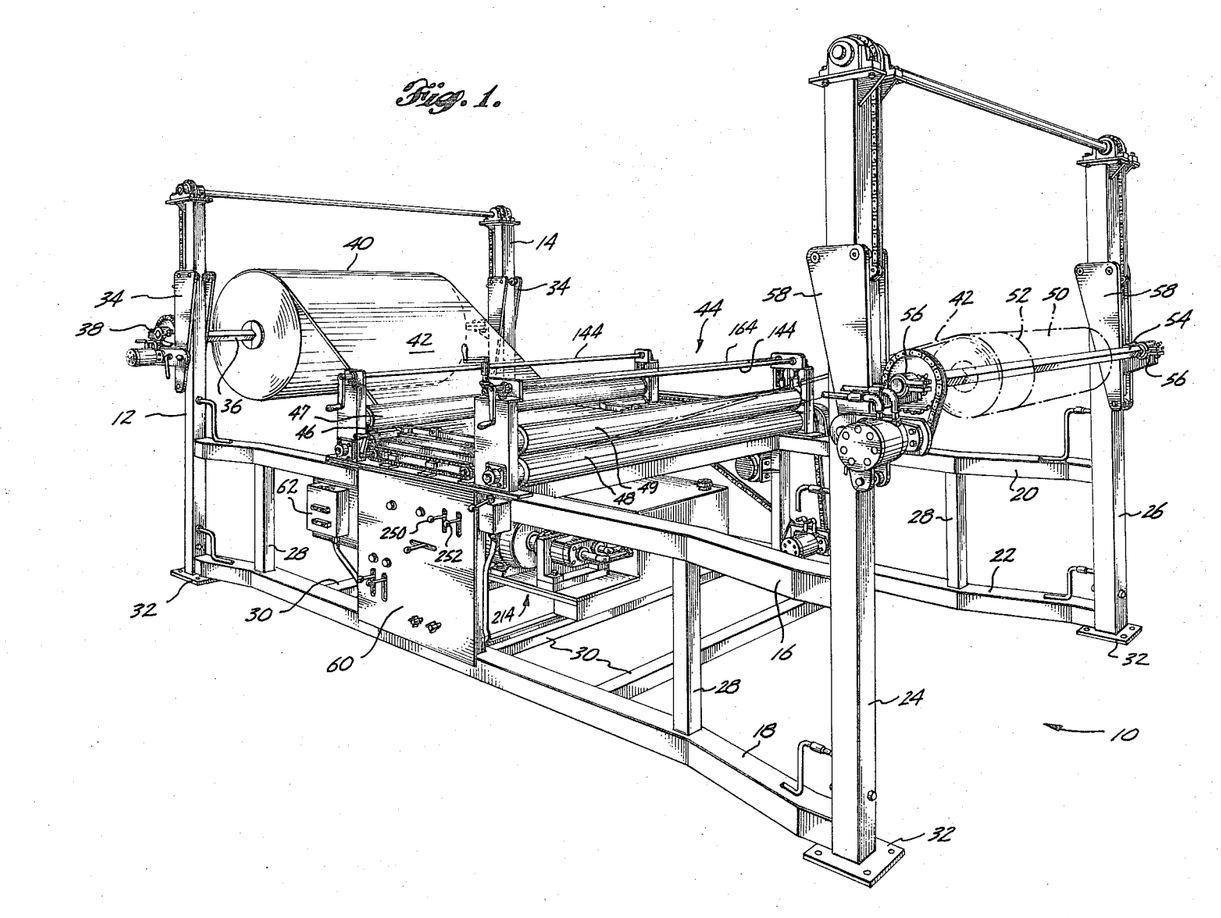
FIG. 1 is an isometric view of the sheet material slitting apparatus of the present invention.

Referring to FIG. 1 the slitting apparatus generally designated 10 includes a frame composed of supply end standards 12 and 14, front side rails 16 and 18, rear side rails 20 and 22, and take-up standards 24 and 26. The side rails 16, 18, 20 and 22 are joined together by vertical frame members 28 while the bottom side rails 18 and 22 are joined by cross members 30. The floor support members 32 situated at each of the bottom uprights can be fastened to the surface on which the apparatus 10 rests, and, if desired, can include leveling screws or other suitable leveling means to horizontally adjust the machine.

Adjustable brackets 34 are slidably mounted for vertical movement on each of the standards 12 and 14. Brackets 34 are powered for vertical movement by hydraulic mechanism which will be described in detail later. A supply roll shaft 36, is journaled in separable bushings 38 which are in turn mounted on each of the brackets 34. A roll 40 of sheet material to be slit is mounted on the shaft 36. The height of the roll with respect to the machine is adjusted by raising or lowering the brackets 34 as desired.

The lead end of the sheet material 42 passes across a slitting table, generally designated 44, located in the central portion of the apparatus 10. A pair of feed rolls 46 and 47 are mounted at the entrance to the feed table 44 and a pair of guide rolls 48 and 49 are mounted at the exit to the slitting table 44. The sheet of material 42 passes between the feed rolls 46 and 47, across the slitting table 44 through the guide rolls 48 and 49 and are rolled onto a take-up roll 50. A set of knives (not shown in this FIGURE) are mounted on the slitting table 44 and are interposed in the path of the sheet of material 42 as it passes across slitting table 44. As the material traverses past the knife a longitudinal slit, schematically designated as 52, is cut in the sheet material 42.

The take-up roll 50 is mounted on a take-up shaft 54. The take-up shaft 54 is removably journalled in a pair of separable bearings 56 mounted on brackets 58, similar to brackets 34. Brackets 58 are mounted for upward and downward sliding movement on the standards 24 and 26 at the take-up end of the apparatus 10. Mechanism, which will be described in detail later, is provided for adjusting the height of brackets 58 so that the vertical location of roll 50 can be adjusted as desired.

A control panel 60 is located on the front horizontal braces 16 and 18 of the apparatus 10. Panel 60 contains the appropriate control levers for the hydraulic system which drives the supply shaft 36, the feed and guide rolls 46, 47, 48 and 49 and the take-up shaft 54. Likewise, an electrical control panel 62 is provided adjacent the hydraulic control panel 60. Other hand actuated adjustment mechanism is also located adjacent hydraulic control panel 60 thus facilitating operation of the entire slitting apparatus 10 from a central front location.

Figure 2:
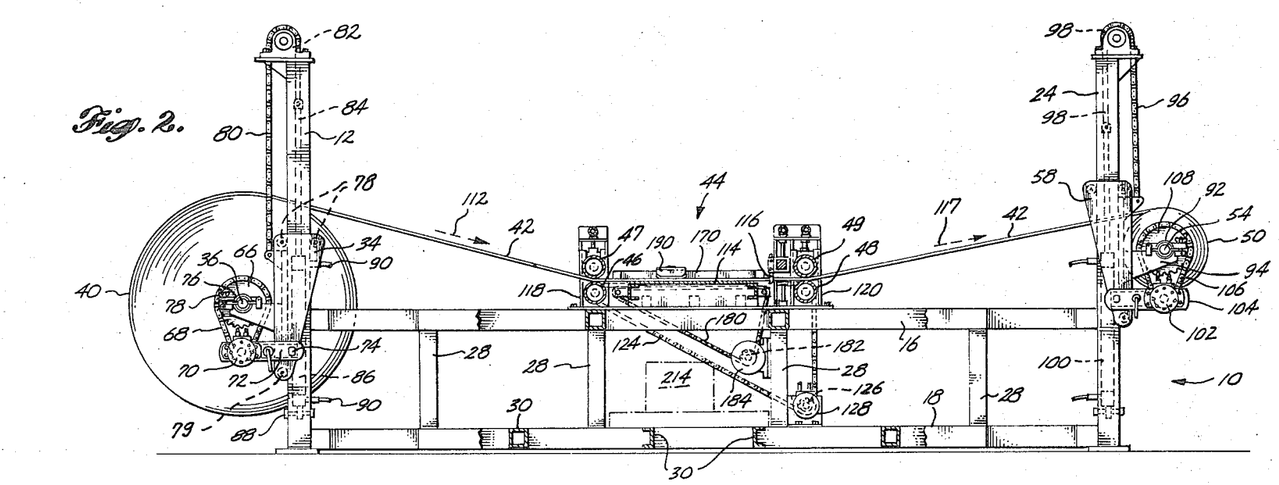
FIG. 2 is an elevation view of the slitting apparatus.
Figure 3:
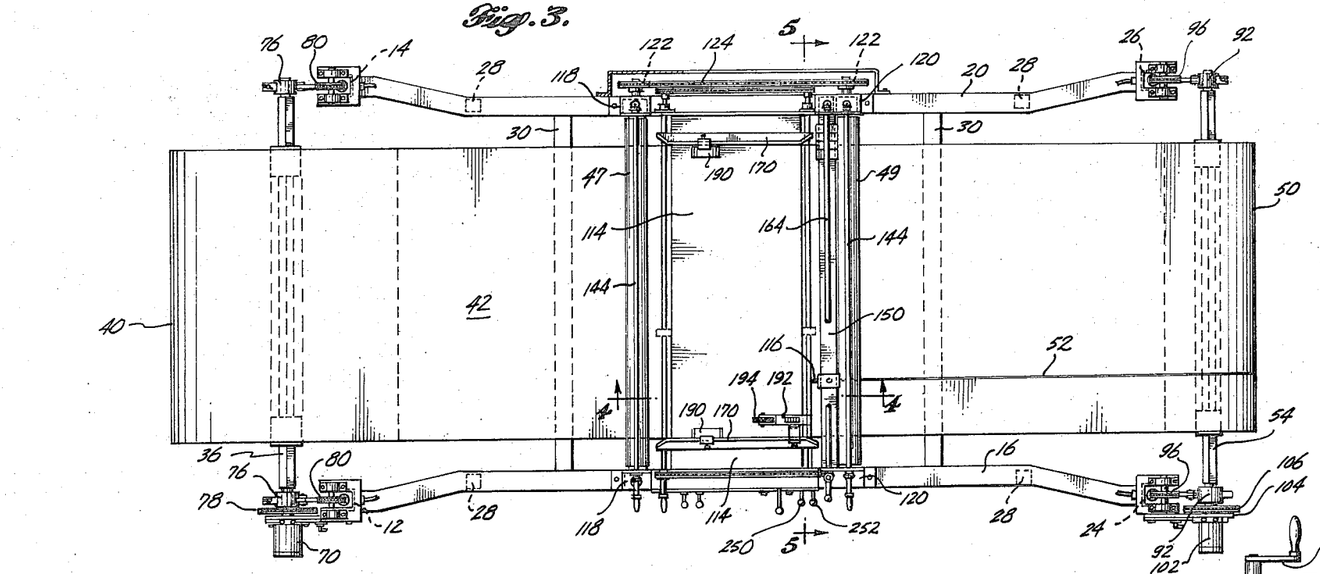
FIG. 3 is a plan view of the slitting apparatus.

Referring jointly to the elevation and plan views of FIGS. 2 and 3, respectively, the supply roll 40 of sheet material is mounted on the supply roll shaft 36. A sprocket 66 is affixed to the shaft 36 and is driven by a chain 68 engaging another sprocket (not shown) on the output shaft of hydraulic motor 70. Hydraulic motor 70 is mounted on an arm 72 which in turn is pivotally mounted by pin 74 on the vertically adjustable bracket 34. Shaft 36 is mounted in a bushing 76 which is diametrically separable. Thus, the supply shaft 36 can be inserted through the roll 40 before the roll is placed on the machine and thus can be placed as a unit in the separable bushing 76. After the roll 40 and shaft 36 are placed on the apparatus 10 the separable bushing 76 is clamped together by means of fastener 78.

Bracket 34 is mounted for vertical sliding movement on standard 12 by means of rollers 78 journaled on the bracket 34 and engaging the outward and inward sides of the standard 12. Similar rollers 79 are journaled at the lower end of bracket 34 and engage the outward side of vertical standard 12.

A link chain 80 or other suitable flexible member is attached to the upper end of the bracket 34 and passes over an idler sprocket 82 mounted at the top end of vertical standard 12. The chain 80 passes downwardly into the hollow care of standard 12 and connects to the piston arm 84 of a hydraulic cylinder assembly. The hydraulic cylinder 86 firmly affixed by pin 88 in the hollow core of standard 12. Hydraulic conduits 90 pass through the standard 12 and are in fluid communication with the hydraulic circuitry described in detail later. Both the vertical standards 12 and the like standard 14 at the supply end of the machine house similar mechanism for elevating or lowering the brackets 34. By actuating the hydraulic cylinder 86 the roll 40 can be positioned upwardly or downwardly as desired. Furthermore the standard 34 can be lowered to a position which will not require lifting the roll 40 to a great height when positioning the roll 40 on the machine.

Similar rail elevating mechanism to that just described is provided on the take-up end of the machine to raise and lower the brackets 58 on which the take-up shaft 54 is mounted. Similar diametrically separable bushings 92 are provided on an arm 94 connected to the bracket 58. A chain 96 engages a sprocket 98 mounted at the top of standard 24 and is connected to hydraulic cylinder mechanism 100, located in the hollow core of standard 24. Similar elevating mechanism is provided in the opposing vertical standard 26 at the take-up end of the apparatus 10.

A hydraulic motor 102 is mounted on arm 104. The output shaft of the hydraulic motor 102 has a sprocket (not shown) engaging a link chain 106. Link chain in turn engages sprocket 108 in turn connected to the take-up shaft 54. Both hydraulic motors 70 and 102 are independently powered from a hydraulic fluid source described in detail later.

As sheet material 42 is fed from roll 40 in the direction of arrow 112, it passes between a pair of feed rolls 46 and 47 at the entrance side of slitting table 44. It passes across a table 114 past a knife edge 116 and between guide rollers 48 at the exit end of the slitting table 44. From there it proceeds in the direction of arrow 117 to be wound onto the take-up roll 50. Each of the bottom rolls 46 and 48 of the feed and guide rolls are journaled in suitable bearings in upright frame members 118 and 120 attached to the top side rails 16 and 18. A sprocket 122 is attached to each of the rearward ends of the bottom rolls 46 and 48. Chain 124 engages the sprockets 122 as well as a sprocket 126 on the output shaft of hydraulic motor 128. Hydraulic motor 128 is attached to a platform (not shown) mounted on the cross bars 30. Thus the bottom rolls 46 and 48 are simultaneously driven to advance the sheet of material 42 across the slitting table 44.

Figure 4:
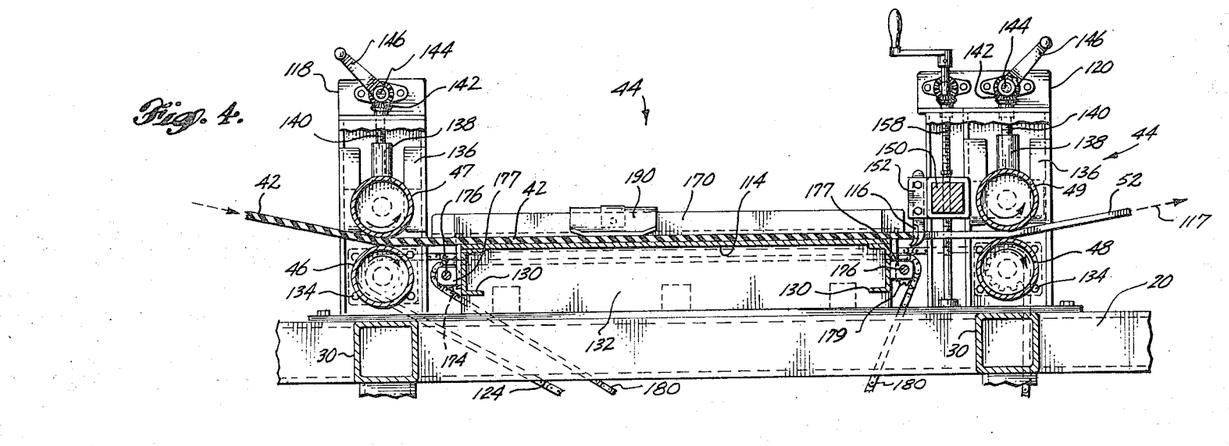
FIG. 4 is an enlarged cross-sectional view of the slitting table taken along section line 4—4 of FIG. 3.
Figure 5:
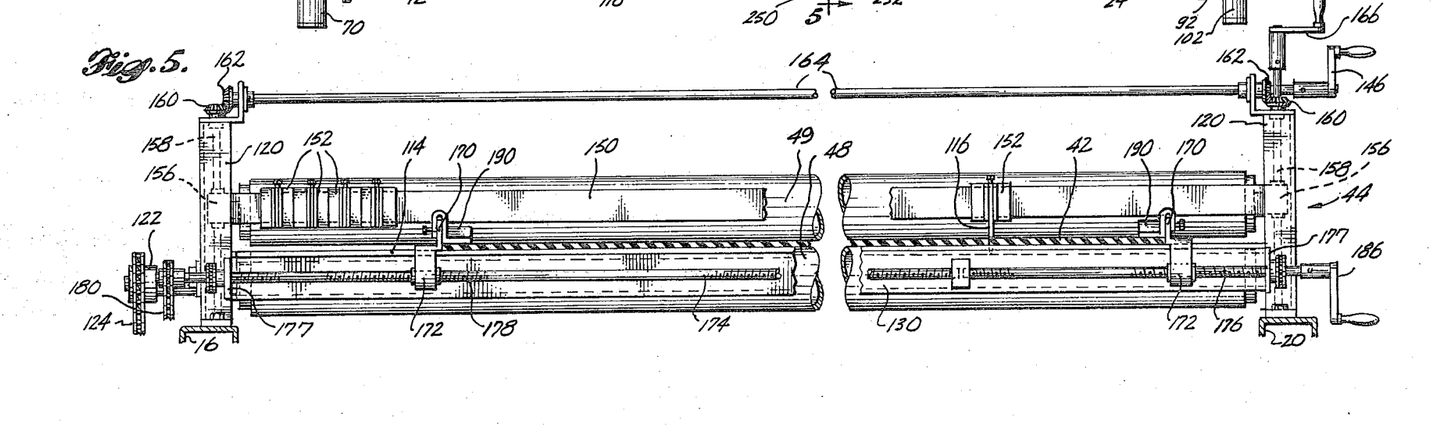
FIG. 5 is a lateral cross-sectional view of the slitting table taken along section line 5—5 of FIG. 3.

Referring to the detailed views of the slitting table 44 shown in FIGS. 4 and 5, the table bed 114 is mounted on a pair of laterally extending channels 130. Channels 130 are in turn mounted on side plates 132 which are firmly affixed to the horizontal rails 16 and 20. The bottom rolls 46 and 48 are journaled for rotation in bearing holders 134 in turn affixed to the standards 118 and 120 and similar standards mounted on rail 20.

Upper tension rolls 47 and 49 are journaled in vertical sliding brackets 136 mounted for upward and downward movement on standards 118 and 120 and the similar standards mounted on rail 20. By vertical movement of the brackets 136 the upper tension rolls 47 and 49 can vary the driving tension or pressure on the sheet material 42. A cylindrical screw rack 136 is affixed to each of the brackets 136 and is threadably engaged by a threaded screw 140. The upper end of screws 140 is affixed to a bevel gear 142 mating with bevel gears attached to each end of a shaft 144 journaled in the brackets on standards 118 and 120. Shafts 144 extend outwardly beyond the front standards 120 and 118. Cranks 146 are attached to the protruding ends of shafts 144 for manual raising and lowering of the rolls 47 and 49.

A knife bar 150 also extends between the standards 120 laterally across the slitting table 44. A plurality of laterally adjustable knife holders 152 are slidably mounted on the bar 150. A knife 116, one of which is shown in FIGS. 4 and 5, can be removably mounted in the holders 152. The holders 152 can be firmly positioned at any location across the holder bar 150 so that any desired width of belting can be slit from roll 40 of sheet material (FIG. 1). The knife bar 150 is also mounted for upward and downward sliding movement in the standards 120. A pair of vertically directed threaded screws 158 are also mounted in each of the standards 120 and journaled for rotation. The threaded portion of the vertical bars 158 engage a screw rack 156 attached to each end of holder bar 150. By rotation of screws 158, holder bar 150 can be raised or lowered as described. The two screws 158 each have a bevel gear 160 mounted at the tops thereof mating with bevel gears 162. The bevel gears 162 are attached to a laterally extending shaft 164 journaled in the brackets on the top of the standards 120. By operation of the crank 166 connected to the top of the front bar 158, both bars 158 can be rotated simultaneously and both ends of the knife-holder bar 150 raised and lowered at the same time. Thus by raising and lowering the bar 150 the knife 116 can be raised and lowered into and out of engagement with the path of the sheet material 42.

A pair of guide bars 170 are mounted for longitudinal sliding movement across the top of the table 144. Guide bars 170 extend in a longitudinal direction with guide surfaces capable of mating with the edges of the sheet material 42 as it traverses the table surface 114. Arms 172 extend downwardly from each end of bars 170 and have female threaded portions at the bottom. The front arms 172, i.e., the one nearest the front of the apparatus 10, have right-handed threads, whereas the rear arms 170 have left-handed threads. Rods 174, having mating right-handed threaded portions 176 and left-handed threaded portions 178, engage the internally threaded portions of arms 172. The rods 174 are journaled in brackets 177 suitably mounted to the channels 130.

Sprockets 179 are fixed to the rearward ends of the rods 174. The sprockets 179 are engaged by a link chain 180, interconnecting the two rods 174. As can be seen by reference to FIG. 2, link chain 180 also engages a drive sprocket 182 affixed to the output shaft of a suitable motor 184, such as a reversible electric or hydraulic motor 184. When motor 184 is activated in one direction, the guide bars 170 are moved apart through the chain drive mechanism and rods 174. By reversing the rotational direction of the motor 184, guide bars 170 can be moved together. For manual adjustment a manual crank 186 (FIG. 5) is attached to the front end of one of the rods 174 so that fine adjustments can be made by hand.

Thus it can be seen that as sheet material 42 passes across the slitting table 44, it is maintained under a constant tension by the feed rolls 46 and 47 and by the guide rolls 48 and 49. Lateral play in the material is held to a minimum by engagement of the guide bars 170 with the side edges of the sheet material 42. In addition a horizontal guide bracket is removably attached to the top portion of guide bars 170. The bottom surface of horizontal guide bracket 190 contacts the upper surface edge of the material 42 to prevent it from climbing up the sides of the guide bars 170.

If desired, a suitable length counter 192 can be added as a component to the blade holder bar 150. As seen in FIG. 3, the length counter 192 is mounted on the guide bar so that as the guide bar is lowered into a position where the knives 154 will cut the material 42, the wheel 194 of the counter 192 will engage the top surface of the material 42. Such length counters are usually provided with a suitable readout device so that the exact dimensions of the material 42 can be measured as it is being slit.

Figure 6:
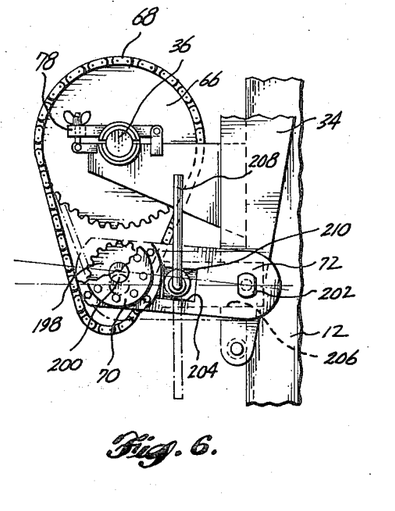
FIG. 6 is an enlarged view of the disengageable drive mechanism for the supply shaft and the take-up shaft.

Referring now to FIG. 6, the disengaging mechanism for the supply shaft drive and for the take-up shaft drive is illustrated in detail. The sprocket 66 is connected to the supply shaft 36. A link chain 68 engages the sprocket 66 as well as the sprocket 198 affixed to the output shaft 200 of the hydraulic motor 70. Hydraulic motor 70 is firmly attached to the arm 72, in turn pivotally mounted by pin 202 to the bracket 34. A square aperture 204 is provided in the arm 72. A lever 208 is journaled on a flange 206 which is also affixed to bracket 34. A cam 210 is affixed to the lever 208. When lever 208 is moved to an upward position the cam 210 biases the arm 72 in an upward direction, thus disengaging the sprocket 198 from the chain 68. Likewise when the lever 208 is placed in the down position, shown in dot-dash lines, arm 72 is biased to its downward position where sprocket 198 can engage chain 68. When arm 72 is in its upper position, chain 68 can be removed from the sprocket 66 to allow separation of bearing 76. By loosening fastener 78 and separating bearing 76 shaft 36 can be removed from the bracket 34. A similar, but mirror image disengagement device, is employed on the brackets 58 for removal of the take-up shaft 54.

Figure 7:
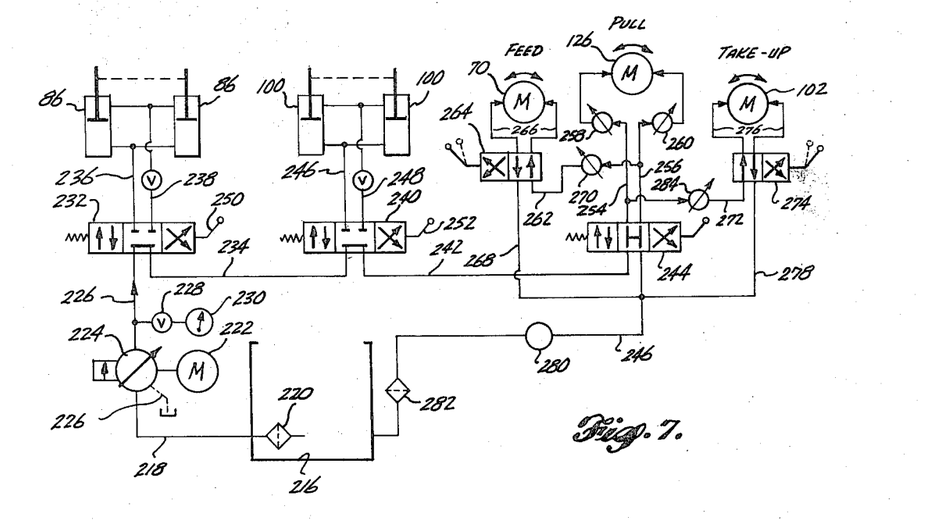
FIG. 7 is a schematic of the hydraulic circuit utilized with the present invention.

As best seen in FIG. 2 in dot-dash outline a hydraulic motor, pump and sump are mounted centrally of the apparatus 10 as shown at 214. A schematic diagram of the hydraulic circuitry utilized in conjunction with the preferred invention is illustrated in FIG. 7. It is to be understood that suitable commercial components can be utilized for purposes of the hydraulic system herein described. The preferred hydraulic circuitry utilized with the present invention provides flexibility, allows variable speed adjustment of all the hydraulic motors as well as powered raising and lowering of the supply and take-up rolls.

A hydraulic sump 216 is in fluid communication with a first conduit 218. A filter 220 is interposed in the inlet to conduit 218. A suitable electric motor 222, for which an on-off switch exists on the electrical console system 62 (FIG. 1), drives a variable output hydraulic pump 224. Pump 224 can be adjusted from zero to maximum output. When the pump 224 is adjusted for less than maximum output, excess hydraulic fluid is returned to the sump via conduit 226. The output from hydraulic pump 224 is in fluid connunication with conduit 226. A suitable shut-off valve 228 and pressure gauge 230 are connected to conduit 226.

Conduit 226 is connected to the input port of a three-position four-way valve 232. The four-way valve 232 is preferably biased to a neutral position whereby fluid passes through valve 226 into output conduit 234. As shown diagrammatically the other two positions of valve 232 provide for forward or reverse flow through conduits 236 and 238. A suitable shut-off valve is interposed in conduit 238. Conduit 236 is in fluid communication with one side of a pair of hydraulic cylinders 86, which as previously described power the raising and lowering of brackets 34 (FIG. 1) to raise and lower the supply roll 40. The other end of hydraulic cylinder 86 is in fluid communication with conduit 238.

Conduit 234 is connected to the inlet port of a second four-way three-position hydraulic valve 240. This hydraulic valve 240 is designed so that in its neutral position, to which it is preferably biased, hydraulic fluid will pass from conduit 234 into conduit 242 connected to the inlet port of a third three-position four-way hydraulic valve 244. Valve 240 provides either forward or reverse flow to conduits 246 and 248 in its other two positions. Conduit 246 is connected to one end of a pair of hydraulic cylinders 100. Conduit 248 is connected to the other side of the hydraulic cylinders 100. The hydraulic cylinders 100 (as explained in conjunction with FIG. 2) power the upward and downward movement of the take-up roll 50. The valves 232 and 240 have actuating levers 250 and 252, respectively, which are mounted for access from the hydraulic control panel 60 (FIG. 1).

Four-way valve 244 supplies hydraulic fluid to three hydraulic motors 70, 126 and 102. Hydraulic motor 70 drives the feed roll shaft, hydraulic motor 126 drives the feed and guide rolls 46, 47, 48 and 49, and hydraulic motor 102 drives the take-up roll shaft 54. Valve 244 is designed to by-pass flow from conduit 242 into return conduit 246 in its neutral position. In the other two positions valve 244 is designed to provide either forward or reverse flow through conduits 254 and 256. Conduits 254 and 256 are connected to the ports of the hydraulic motor 126. Flow in one direction will cause the hydraulic motor 126 to rotate in a first direction. Flow in the opposite direction through conduits 254 and 256 will cause the hydraulic motor 126 to rotate in a second opposite direction.

Modulating valves 258 and 260 are interposed respectively in conduits 254 and 256. The valves 258 and 260 have the capability to vary flow in the respective conduits 254 and 256. Valves 258 and 260 are designed to vary flow in one direction only while allowing full flow in a reverse direction. Thus two valves are required to vary the flow of fluid in conduits 254 and 256 to adjust the speed of the motor 126 in both directions.

Conduit 262 is placed in fluid communication with conduit 256 and with the inlet port to a two-position four-way valve 264. Valve 264 is designed to provide forward or reverse flow through the conduits 266, thus providing forward or reverse rotation of the hydraulic motor 70. Fluid returns in either mode to conduit 246 via conduit 268. A variable valve 270 is interposed in conduit 262 to control the speed of rotation of hydraulic motor 70. Likewise, conduit 272 is in fluid communication between conduit 254 and the inlet port to a second two-position four-way valve 274. Four-way valve 274 is designed to provide forward or reverse flow through conduits 276 to provide forward or reverse rotation of hydraulic motor 102. Fluid is returned from the valve 274 viaconduit 278 to return conduit 246.

A convenient shut-off valve 280 is interposed in return conduit 246 as well as a filter element 282. Ultimately return conduit 246 returns all hydraulic fluid flowing through the system to the sump 216.

In operation it can be seen that the three-position four-way valve 244 can control completely the forward and reverse directional rotation of all three hydraulic motors 70, 126 and 102. In addition, by manipulation of the modulating flow valves 270, 258, 260 and 284 (interposed in conduit 272) the speed of rotation of any of the hydraulic motors 70, 126 and 102 can be varied as desired between zero and maximum speed. It is apparent that speed modulation of each of the hydraulic motors can be accomplished independently of speed modulation of the others.

If quick stretching of a sheet of material or elastic belting being slit is desired it is readily seen that the flow through one of the hydraulic motors 70 or 102 can be reversed by manipulation of valve 264 and/or 274. This will provide for opposite rotation of the supply shaft with respect to the take-up shaft providing almost immediate stretching of the sheet material 42. Likewise, the speed of the hydraulic motor 70 can be slowed down by manipulation of valve 270 with respect to the drive for the main feed and guide rolls and the take-up drive.

The present invention has been described in relation to a preferred embodiment. It is to be understood that one of ordinary skill in the slitting apparatus art can make various modifications, substitutions of equivalents and other changes without departing from the concept of the invention as herein disclosed. It is therefore intended that the present invention be limited only by the definition contained in the appended claims.

What is claimed is:

1. An apparatus for longitudinally slitting rolled sheet material comprising:

a structural frame having first and second ends, first bracket means mounted on the first end of said frame, said bracket means being height adjustable relative to said frame, a first shaft rotatably and removably mounted on said first bracket means, first driving means for reversibly driving said first shaft at a variable speed, second bracket means mounted on the second end of said frame, said second bracket means being height adjustable relative to said frame, a second shaft rotatably and removably mounted on said second bracket means, second driving means for reversibly driving said second shaft at a variable speed, a first set of driven roll means for frictionally engaging and forwarding said sheet material, means mounting said first set of roll means for rotation between said first and second bracket means,
a second set of driven roll means for frictionally engaging and forwarding said sheet material, means mounting said second set of driven roll means for rotation between said first and second bracket means and spaced from said first set of driven roll means,
third driving means for driving said first set and second set of driven roll means at a variable speed,
laterally adjustable knife means mounted on said frame between said first and second sets of driven roll means, and
guide means for engaging the sides of a sheet passing between said sets of driven rolls, said means including a pair of guide bars having longitudinally extending contact faces, said guide means including means for adjusting the lateral spacing between said guide bars, said means being selectively powered by a hand actuatable means and a prime mover means.

2. An apparatus for longitudinally slitting rolled sheet material comprising:
a structural frame having first and second ends,
first bracket means mounted on the first end of said frame, said bracket means being height adjustable relative to said frame,
a first shaft rotatably and removably mounted on said first bracket means,
first driving means for reversibly driving said first shaft at a variable speed,
second bracket means mounted on the second end of said frame, said second bracket means being height adjustable relative to said frame,
a second shaft rotatably and removably mounted on said second bracket means,
second driving means for reversibly driving said second shaft at a variable speed,
a first set of driven roll means for frictionally engaging and forwarding said sheet material, means mounting said first set of roll means for rotation between said first and second bracket means,
a second set of driven roll means for frictionally engaging and forwarding said sheet material, means mounting said second set of driven roll means for rotation between said first and second bracket means and spaced from said first set of driven roll means,
third driving means for driving said first set and second set of driven roll means at a variable speed,
laterally adjustable knife means mounted on said frame between said first and second sets of driven roll means, and
at least one of said bracket means including an arm pivotally mounted to said bracket means, a hydraulic motor connected to said arm and having an output shaft and a drive sprocket thereon, a driven sprocket on said shaft associated with said one of said bracket means, means drivably engaging said sprockets, cam means for pivotally moving said arm between a first and second position said drive sprocket engaged with said driven sprocket in said first position and disengaged from said driven sprocket in said second position.

3. A method for slitting elastic sheet material comprising:
feeding said sheet material from a supply zone to the entrance of a slitting zone at a first predetermined variable rate,
forwarding said material across said slitting zone at a second predetermined variable rate by controlling the input rate of the material at the entrance of said slitting zone and by controlling the output rate at the exit to said slitting zone,
slitting said material between said entrance and the exit to said slitting zone as said material passes through said slitting zone,
stretching said material within said slitting zone by maintaining said first rate less than said second rate for a first period of time and thereafter equalizing said first rate and said second rate to feed said material through said slitting zone in a stretched condition, and
feeding said material to a storage zone from said exit of said slitting zone.

4. A method for slitting elastic sheet material comprising:
feeding said sheet material from a supply zone to the entrance of a slitting zone at a first predetermined variable rate,
forwarding said material across said slitting zone at a second predetermined variable rate by controlling the input rate of the material at the entrance of said slitting zone and by controlling the output rate at the exit to said slitting zone,
slitting said material between said entrance and the exit to said slitting zone as said material passes through said slitting zone,
feeding said material to a storage zone from said exit of said slitting zone at a third predetermined variable rate, and
stretching said material within said slitting zone by maintaining said third rate greater than said second rate for a period of time and thereafter equalizing said second rate and said third rate to feed said material through said slitting zone in a stretched condition.

5. In an apparatus for slitting sheet material including a frame having first and second ends, a supply roll shaft mounted for rotation at one end of said frame, a take-up roll shaft mounted for rotation at the other end of said frame, a pair of guide rolls and a pair of feed rolls, said guide and feed rolls mounted for rotation on said frame between said supply shaft and said take-up shaft, said shafts and said guide and feed rolls having substantially parallel axes of rotation, and a knife means adjustably mounted on said frame between said guide and feed rolls, the improvement comprising:
first means for reversibly driving said supply roll shaft at selectively variable rotational speeds, and
second means for reversibly driving said guide rolls and said feed rolls at selectively variable rotational speeds, independently of said first means.

6. The improvement of claim 5 further comprising:
third means for reversibly driving said take-up shaft at selectively variable rotational speeds independently of said first means and said second means.

7. The improvement of claim 6 wherein each of said first, second and third means comprises a hydraulic motor means and flow reversing and variable flow valve means operatively associated with said motor means for reversing and modulating the flow of hydraulic fluid to said motor means, and means for supplying hydraulic fluid to each of said motor means through said valve means.

8. The improvement of claim 6 wherein said first, second, and third means, respectively, comprise a first, second and third hydraulic motor, hydraulic fluid circuit means for said apparatus comprising:

a hydraulic pump and a prime mover means therefor, a fluid reservoir in fluid communication with said pump, a first three position four-way valve means operably connected to said pump and said reservoir, first conduit means operably connecting said first four-way valve means to said first hydraulic motor, second conduit means operably connecting said first four-way valve means to said second hydraulic motor, third conduit means operably connecting said first four-way valve means to said third hydraulic motor, a first flow reversing four-way valve means interposed in said second conduit means, a second flow-reversing four-way valve means interposed in said third conduit means, a first flow modulating valve interposed in said first conduit means, a second flow modulating valve interposed in said second conduit means, and a third flow modulating valve interposed in said third conduit means.

9. In an apparatus for slitting a sheet of material including a pair of guide rolls and a pair of feed rolls mounted for rotation on a frame, said rolls having substantially parallel axes of rotation, the improvement comprising:

means between said pairs of guide and feed rolls for slitting the sheet of material;

guide means for engaging the longitudinal sides of a sheet passing between said pairs of guide and feed rolls, said means including a pair of guide bars having longitudinally extending contact faces, and including drive means for adjusting the lateral spacing between said guide bars, said drive means being selectively powered by a hand actuatable means and motor means.

10. In an apparatus including means for slitting sheet material a support means and a shaft rotatably and removably mounted on said support means, said shaft capable of holding a roll of said sheet material the improvement comprising:

an arm and means mounting said arm on said support means for movement relative to said shaft, a drive sprocket rotatably mounted on said arm and means for driving said sprocket, a driven sprocket mounted on said shaft and means for drivably engaging said sprockets, and actuating means for moving said arm between a first position wherein said sprockets are engaged and a second position wherein said sprockets are disengaged.

* * * * *